US012565257B2

(12) United States Patent
Durillon

(10) Patent No.: US 12,565,257 B2
(45) Date of Patent: Mar. 3, 2026

(54) METHOD FOR ATTACHING A LID TO AN ORIFICE OF A POWER STEERING SYSTEM AND SUCH A LID

(71) Applicant: JTEKT EUROPE, Irigny (FR)

(72) Inventor: Arnaud Durillon, Longes (FR)

(73) Assignee: JTEKT EUROPE, Irigny (FR)

( * ) Notice: Subject to any disclaimer, the term of this patent is extended or adjusted under 35 U.S.C. 154(b) by 133 days.

(21) Appl. No.: 18/204,743

(22) Filed: Jun. 1, 2023

(65) Prior Publication Data

US 2023/0399044 A1     Dec. 14, 2023

(30) Foreign Application Priority Data

Jun. 13, 2022    (FR) ...................................... 22/05702

(51) Int. Cl.
*B62D 5/04*         (2006.01)
*F16H 57/02*        (2012.01)
*F16H 57/029*       (2012.01)
*F16H 57/031*       (2012.01)

(52) U.S. Cl.
CPC ......... *B62D 5/0403* (2013.01); *F16H 57/029* (2013.01); *F16H 57/031* (2013.01); *B62D 5/0454* (2013.01); *F16H 2057/02034* (2013.01); *F16H 2057/02082* (2013.01)

(58) Field of Classification Search
CPC ................ F16H 57/029; F16H 57/031; F16H 2057/02034; F16H 2057/02082; B62D 5/0403; B62D 5/0454; F16J 15/061; F16J 15/062; F16J 15/32
See application file for complete search history.

(56) References Cited

U.S. PATENT DOCUMENTS

| | | | | |
|---|---|---|---|---|
| 9,915,340 | B2 * | 3/2018 | Fuechsel ............... | F16H 57/032 |
| 9,962,875 | B2 * | 5/2018 | Fuechsel ................. | F16J 15/14 |
| 10,788,151 | B2 * | 9/2020 | Bredbeck .............. | F16J 15/062 |
| 11,618,495 | B2 * | 4/2023 | Amano ............... | F16H 57/0424 |
| | | | | 180/444 |
| 11,623,681 | B2 * | 4/2023 | Guerin .................... | B62D 5/04 |
| | | | | 220/780 |

(Continued)

FOREIGN PATENT DOCUMENTS

| | | | | | |
|---|---|---|---|---|---|
| CN | 111332359 | A | * | 6/2020 | |
| CN | 117208071 | A | * | 12/2023 | ......... B62D 15/0225 |

(Continued)

OTHER PUBLICATIONS

Machine translation of DE 102018203005 A1 obtained on Dec. 9, 2024.*

(Continued)

*Primary Examiner* — Adam D Rogers
(74) *Attorney, Agent, or Firm* — Oliff PLC

(57)                 ABSTRACT

A power steering case, including an opening, a lid configured to close the opening of the case, and an O-ring seal disposed in a first annular groove formed in a first inner wall of the lid or of the case, a second inner wall, respectively of the case or of the lid, having a frustoconical shaped portion for progressively compressing the seal before reaching the closed position of the lid where the seal tends to regain a less deformed initial shape in a second annular groove facing the first annular groove and formed in the second inner wall.

12 Claims, 5 Drawing Sheets

(56)　　　　　References Cited

U.S. PATENT DOCUMENTS

| | | | | |
|---|---|---|---|---|
| 12,007,025 | B2 * | 6/2024 | Larsson | ................. F16J 15/061 |
| 12,043,323 | B2 * | 7/2024 | Guerin | ................. B62D 5/0403 |
| 2017/0219139 | A1 | 8/2017 | Bredbeck et al. | |

FOREIGN PATENT DOCUMENTS

| | | | | | |
|---|---|---|---|---|---|
| DE | 10 2006 024 767 | A1 | | 11/2007 | |
| DE | 102011001217 | A1 | * | 9/2012 | ........... B62D 5/0403 |
| DE | 102014103576 | A1 | * | 9/2015 | ........... B62D 5/0403 |
| DE | 102015110599 | A1 | * | 1/2017 | |
| DE | 102018203005 | A1 | * | 8/2019 | |
| FR | 3 096 336 | A1 | | 11/2020 | |
| FR | 3111866 | A1 | * | 12/2021 | |
| FR | 3116039 | A1 | * | 5/2022 | |
| KR | 20250017879 | A | * | 2/2025 | ........... B60K 17/344 |
| WO | 2010/082628 | A1 | | 7/2010 | |

OTHER PUBLICATIONS

O-ring Wikipedia Page; https://en.wikipedia.org/wiki/O-ring.*
Jun. 13, 2022 Written Opinion and Search Report issued in French
Patent Application No. 907105.

* cited by examiner

METHOD FOR ATTACHING A LID TO AN ORIFICE OF A POWER STEERING SYSTEM AND SUCH A LID

TECHNICAL FIELD

The present invention concerns the field of cases of power steering systems of motor vehicles, and more specifically, a case, an assembly associating a lid on a case, as well as a method for attaching a lid on the case.

STATE OF THE ART

Motor vehicles include a steering system provided with a steering wheel driving a steering column. The steering column is connected to a steering box comprising a rack extending along a transverse axis connecting the two steered wheels of the vehicle. The rack makes it possible to pivot the steered wheels of the vehicle through rotation of the steering wheel.

A power steering system also includes an assistance device applying an assistance force to the rack depending on that given by the driver on the steering wheel. Thus, the force required to the driver to pivot the steering wheel can be reduced.

A known electric assistance device includes an electric motor coupled to a speed reducer comprising a case fixed to the motor, a worm gear, and a worm wheel driven by the worm gear and attached to a shaft connected to a pinion meshing the rack.

Such a case generally comprises one or more attaching seats which delimit an access orifice passing through an outer wall of the case to allow introduction and assembly of all or part of the elements of the speed reducer. The access orifice must be closed by means of a lid generally provided with a seal, for example a toroid-shaped seal, in order to prevent any intrusion of liquid or foreign bodies, such as gravel, dust, into the case, and thus guarantee lastingly the correct operation of the speed reducer.

According to a known solution, the lid is attached to the case by means of clips, present on the lid. The clips fit into a groove machined in the case, around the circumference of the inner surface of the orifice. The use of such a lid has the disadvantage of enabling to visually control the correct insertion of the clips in the groove. Thus, it is impossible to check the correct insertion and proper holding of the lid. Furthermore, the presence of clips on the lid entails an additional risk of breakage and requires an additional manufacturing operation leading to an increased manufacturing cost.

According to a known solution, the lid is attached to the case by means of screws engaged in attaching lugs of the lid and in orifices formed in barrels arranged on the case. This solution is also not satisfactory, since it requires additional parts, namely screws, forming barrels on the case and drilled lugs around the lid. The attaching lugs can also cause space problems and may not be compatible with the space available in the system. Furthermore, if the number of attaching points by a screw is limited to two, the lid may deform at high temperature. This solution also requires additional manufacturing operations to screw the lid onto the case.

It is therefore desirable to simplify the operations for attaching a lid to a case and to reduce the number of parts required for this purpose, in order to close, in a sealed manner, an orifice formed in the case. It is also desirable to simplify the shape of the lid and of the case, while ensuring tightness of the closure of the case by the lid, in particular in order to simplify the manufacture and machining of these parts. It may also be desirable for cost reasons to make the lid from the lowest cost plastic material.

SUMMARY

Embodiments relate to a method for attaching a lid to an opening formed in a power steering case, the method comprising steps consisting of: inserting the lid into the opening of the case until an O-ring seal disposed in a first annular groove formed in a first inner wall of the lid or of the case, comes into contact with a frustoconical shaped portion of a second inner wall, respectively of the case or of the lid, and exerting a pressure on the lid to pass the seal over the frustoconical shaped portion where it is gradually compressed, until reaching a closed position of the lid on the opening of the case, where the seal tends to regain a less deformed shape in a second annular groove opposite of the first annular groove and formed in the second inner wall.

Thanks to these arrangements, the elasticity of the seal is used to clip the lid onto the case. Thus, the need to form additional elements on the lid and the case, such as clips, lugs and threaded barrels, is avoided, and the operations of closing the case are simplified, while ensuring the tightness of the closure of the case.

According to one embodiment: the first inner wall is formed on the lid, and the second inner wall is formed in the case, or the first inner wall is formed in the case, and the second inner wall is formed on the lid.

Thus, the seal can be placed in the case or on the lid, as required.

According to one embodiment, when the lid is in the closed position: a peripheral rim of the lid is in abutment against an annular edge of the opening of the case, and/or the inner wall of the lid is in abutment against the frustoconical shaped portion of the case, and/or one end of the inner wall of the lid is in abutment against an annular shoulder formed by the inner wall of the case.

The provision of an abutment prevents the lid from being pushed into the case beyond its closed position.

According to one embodiment, the seal in the first and second annular grooves is maintained elastically deformed, in the closed position of the lid.

This arrangement makes it possible to ensure a good sealing of the closure of the case, as well as maintaining the lid resistant to a certain pressure of expulsion of the lid.

According to one embodiment, the seal has a section dimensioned so as to maintain the lid in the closed position against a pressure differential of 35 kPa between the inside and the outside of the case.

Thus, the pressure resistance for maintaining the lid on the opening of the case can be adjusted by adjusting the dimensions of the section of the seal and therefore of the sections of the grooves to house the seal.

Embodiments may also relate to a power steering case, comprising an opening, a lid configured to close the opening of the case, and an O-ring seal disposed in a first annular groove, formed in a first inner wall of the lid or the case, a second inner wall, respectively of the case or of the lid having a frustoconical shaped portion configured to progressively compress the seal before reaching the closed position of the lid where the seal tends to regain a less deformed initial shape in a second annular groove facing the first annular groove and formed in the second inner wall.

According to one embodiment, the first inner wall is formed on the lid, and the second inner wall is formed in the case, or the first inner wall is formed in the case, and the second inner wall is formed on the lid.

According to one embodiment, the lid comprises a peripheral rim configured to come into abutment against an edge of the opening of the case when the lid is in the closed position.

According to one embodiment, the first annular groove is deeper than the second annular groove.

According to one embodiment, the first annular groove and the second annular groove are shaped so as to accommodate 70 to 75% of the seal in the first annular groove and, respectively, 30 to 25% in the second annular groove.

These ratios make it possible to ensure sufficient maintenance of the seal on the lid or in the case, in particular during insertion and removal movements of the lid on the case.

According to one embodiment, the seal has a section dimensioned so as to maintain the lid in the closed position despite a pressure differential of 35 kPa between the inside and the outside of the case.

According to one embodiment, the frustoconical shaped portion has a flaring angle of comprised between 15 and 30° relative to a direction of insertion of the lid into the opening of the case.

These inclination values of the frustoconical shaped portion make it possible to obtain a sufficiently progressive compression to prevent the seal from being torn or damaged.

According to one embodiment, the groove formed in the case is offset towards the inside of the case by a distance comprised between 0.3 and 0.8 mm.

This arrangement makes it possible to obtain a certain closure pressure of the lid on the case.

BRIEF DESCRIPTION OF FIGURES

The present invention will be better understood through the following description with reference to the appended figures, in which identical reference signs correspond to structurally and/or functionally identical or similar elements.

DETAILED DESCRIPTION

Figure 1:
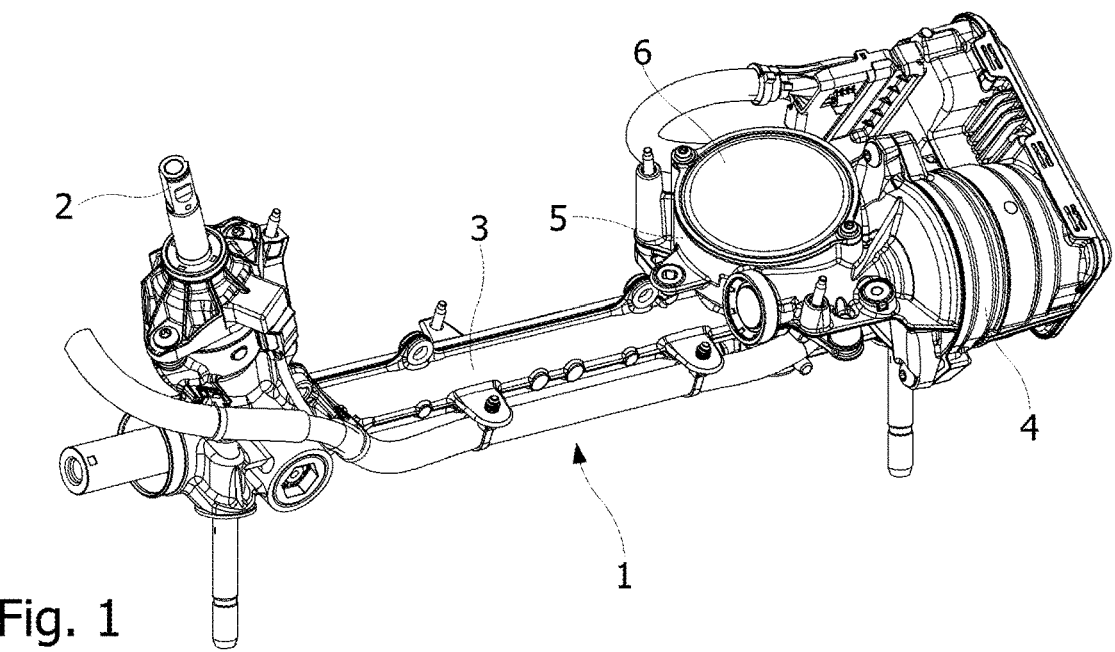
FIG. 1 represents in perspective a part of a power steering system for a motor vehicle.

FIG. 1 represents a dual pinion-on-rack power steering system 1, this system comprising a steering shaft 2 coupled on one side to a steering wheel and on the other end by a first pinion to a rack 3, an assistance motor 4 also coupled to the rack 3 via a speed reducer housed in a case 5, and coupled to the rack 3 via a second pinion. The case 5 is closed off by a lid 6 giving access in particular to a worm wheel with a worm screw, housed in the case.

Figure 2:
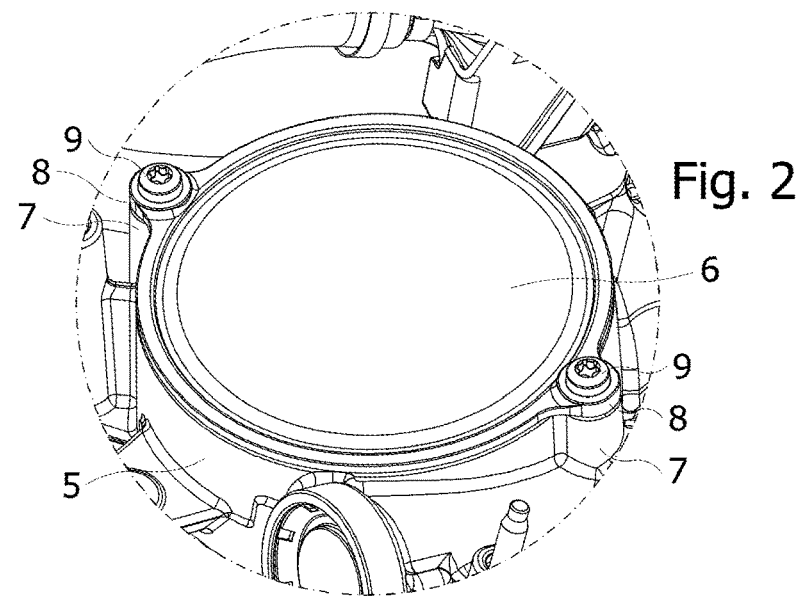
FIG. 2 is a perspective view of a portion of conventional case and lid of the power steering system.
Figure 3:
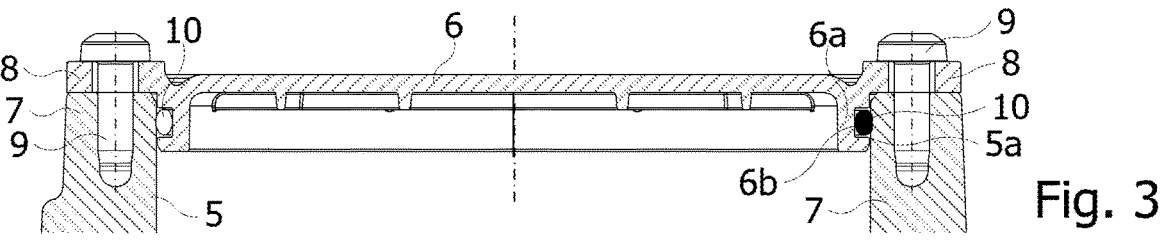
FIG. 3 is a schematic sectional view of the portion of case and the lid.

FIGS. 2 and 3 represent the lid 6 and a portion of the case 5 where the lid is engaged. The lid 6 of circular shape is attached to the case 5 by means of screws 9 engaged in lugs 8 formed at the periphery of the lid 6. The screws 9 are screwed into orifices formed in the barrels 7 formed on the case 5. In FIG. 3, the lid 6 comprises a cylindrical portion 6a provided to engage in an opening 5a of complementary shape formed in the case 5. The cylindrical portion 6a of the lid has an annular groove 6b provided to receive an O-ring seal ensuring tightness of closure, between the cylindrical portion 6a and the opening 5a of the case.

It is desirable to simplify this case closure type, both in terms of number of parts required, and in terms of machining and manufacturing operations.

Figure 4:
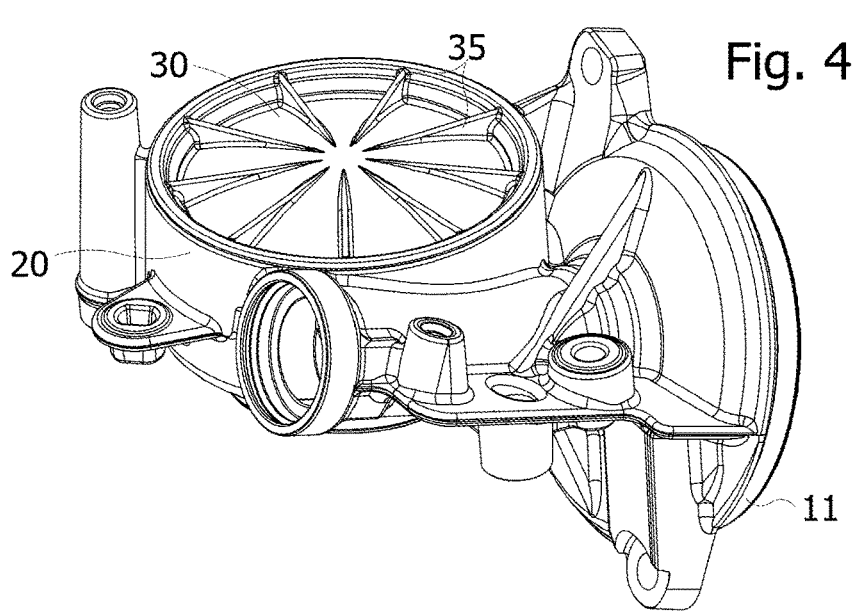
FIG. 4 is a perspective view of a case of a power steering system, closed off by a lid, according to one embodiment.
Figure 5:
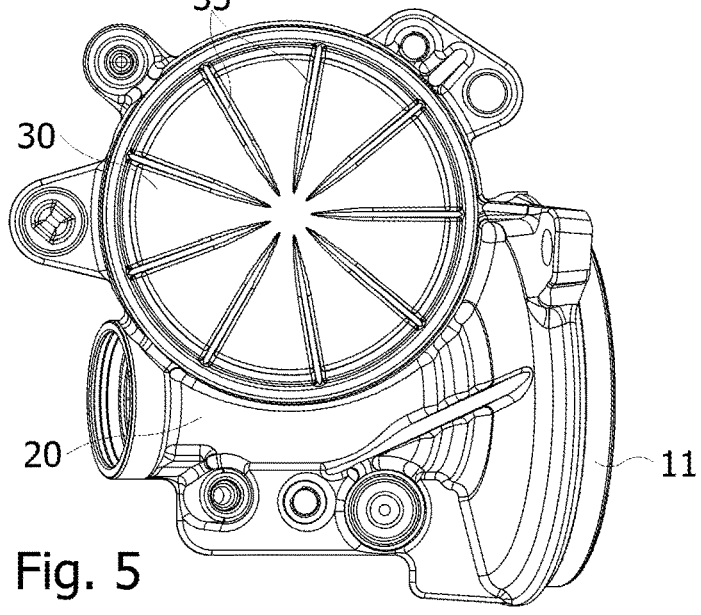
FIG. 5 is a front view of the lid on the case, according to one embodiment.
Figure 6:
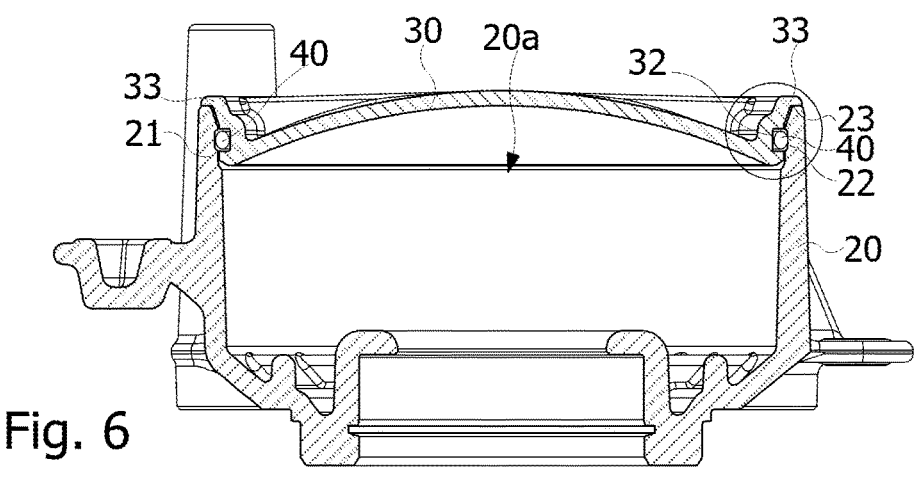
FIG. 6 is a sectional view of the lid on the case, according to one embodiment.

Thus, FIGS. 4 to 6 represent a lid 30 closing off an opening 20a of a case 20. The case 20 can accommodate a speed reducer comprising a worm screw and a worm wheel and include an interface 11 for coupling to a motor. In this application, the lid 30 closes the opening for accessing the worm wheel of the speed reducer.

Figure 7A:
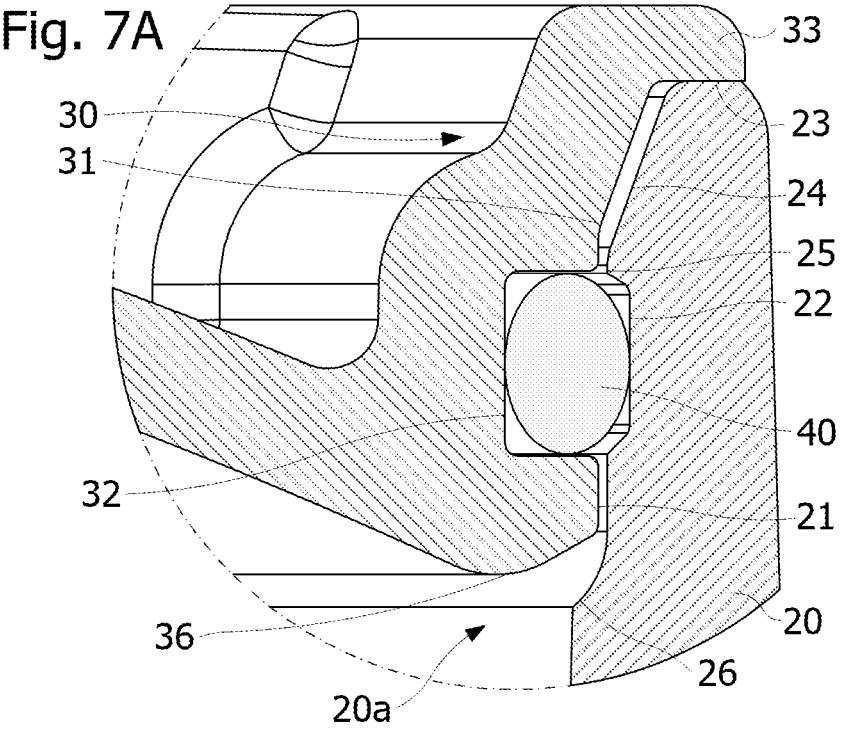
FIGS. 7A, 7B are more detailed sectional views of an edge of the lid, respectively in a closed position on the case opening and in a position preceding the closed position, according to one embodiment.
Figure 7B:
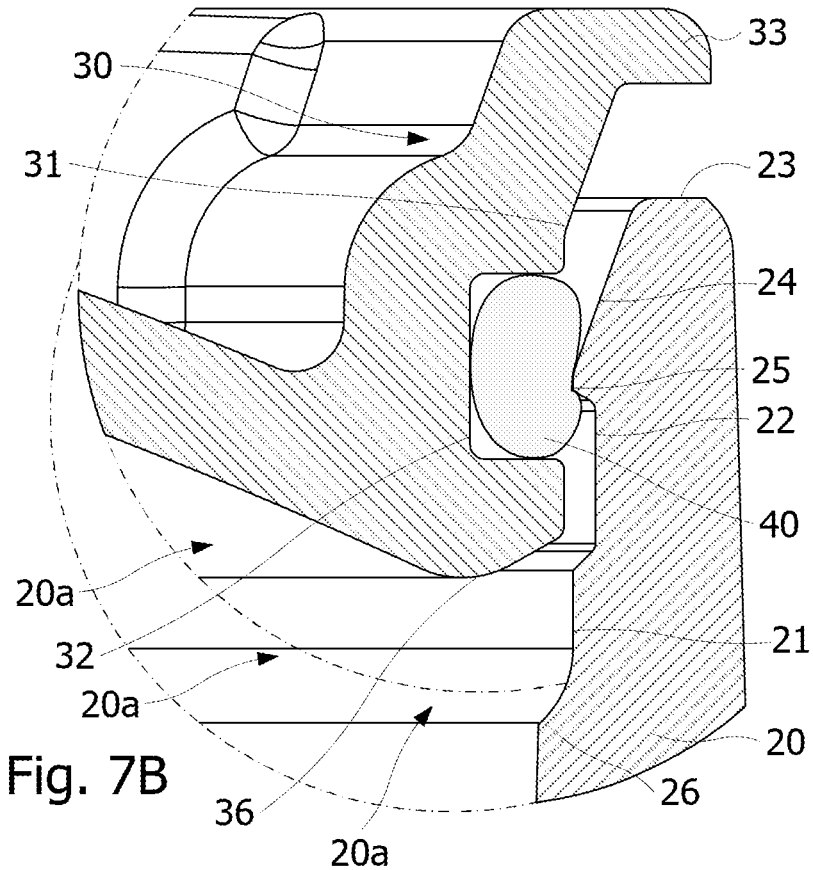

FIGS. 7A, 7B represent the edge of the lid, respectively in the closed position on the case opening 20a and in a position preceding the closed position, according to one embodiment. FIGS. 6, 7A, 7B show in particular the case 20 and the case opening 20a having a substantially cylindrical inner wall 21 adjacent to a circular edge 23. The lid 30 comprises a cylindrical wall 31 having a shape complementary to that of the inner wall 21 of the case 20. The lid 30 comprises a peripheral rim 33 provided to bear on the edge 23 of the case opening 20a, when it closes off the case opening 20a.

According to one embodiment, the inner wall 21 of the case 20 and the wall 31 of the lid 30 each comprise an annular groove 22, 32 disposed so as to face each other when the lid 30 is in the closed position. The grooves 22, 32 are shaped so as to receive an O-ring seal 40.

According to one embodiment, the inner wall 21 of the case 20 has between the edge 23 and the groove 22 a frustoconical shaped portion 24 flaring towards the edge 23. Thus, the opening 20a in the case 20 has a section more narrow between the frustoconical shaped portion 24 and the groove 22. The frustoconical shaped portion 24 is shaped so that the lid can be introduced into the case 20 without effort until the seal 40 abuts on the frustoconical shaped portion 24. A closing abutment of the lid 30, when the rim 33 is in contact with the edge 23, can be reached by exerting a pressure on the lid 30 to force the seal 40 to cross the smaller-diameter end 25 of the frustoconical shaped portion 24 by elastically deforming (FIG. 7B), until the seal reaches the groove 22 of the case 20 where it tends to have its initial undeformed shape (FIG. 7A). Thus, just before the lid 30 reaches its closed position, the seal 40 reaches maximum deformation, to return to a less deformed configuration in the grooves 22, 32. In this way, the lid 30 is clipped onto the case 20, in the closed position.

Thanks to these arrangements, the lid 30 can close the case 20 in a sealed manner, and can be held firmly in its closed position, without requiring additional closing elements such as clips or screws associated with lugs on the lid and threaded barrels on the case.

According to one embodiment, the groove 22 can be offset slightly towards the inside of the case, relative to the groove 32, for example by a distance comprised between 0.3 and mm, to absorb the gaps and ensure that the lid is pressed against the opening 20*a* of the case, the rim 33 of the lid then being in abutment against the edge 23 of the opening. Thus, in the closed position, the smaller-diameter end 25 of the frustoconical portion 24 slightly compresses the seal 40.

To ensure tightness of the closure performed by the lid, the seal 40 remains compressed in the grooves 22, 32.

According to one embodiment, the seal 40 can be mounted beforehand on the lid 30 when it is engaged in the case 20. For this purpose, the groove 32 can be deeper than the groove 22.

According to one embodiment, 70 to 75% of the seal is accommodated in the groove 32 of the lid and respectively 30 to 25% is accommodated in the groove 22 of the case. Thus, the seal 40 can be maintained in the groove 32 and cross the smaller-diameter end 25 of the frustoconical portion 24 to reach the groove 22 without being torn from the groove 32 or damaged. Furthermore, the section of the seal 40 can be dimensioned so that the lid 30 can remain in the closed position despite a pressure differential of 35 kPa between the inside and the outside of the case 20, the internal pressure being greater that the external pressure. The resistance of the lid 30 to an expulsion pressure from the case 20 can also be increased by increasing the proportion of the seal 40 accommodated in the groove 22.

According to an exemplary embodiment, the flaring angle (relative to the direction of insertion of the lid into the case) of the frustoconical portion 24 of the case is comprised between 15 and 30°. In this way, the seal 40 can be compressed progressively enough to avoid being torn from groove 32 or damaged.

According to an exemplary embodiment, the lid 30 has an outwardly domed shape (FIG. 6).

According to an exemplary embodiment, the outer face of the lid 30 has radial ribs 35 extending from the edge 33 towards the center and the lid (FIGS. 4 and 5). These ribs make it possible to stiffen the lid.

According to various exemplary embodiments, the lid 30 has a circular (FIG. 4, 5), oval, oblong, ovoid or elliptical shape.

According to various examples, the lid 30 is made of metal or plastic, by molding or machining. The plastic material used may be polypropylene.

The section of the grooves 22, 32 can be of various shapes, such as rectangular shape, provided that the volume delimited by the opposite grooves 22, 32 is sufficient to absorb the thermal and chemical deformations and expansions of the seal 40.

Figure 8A:
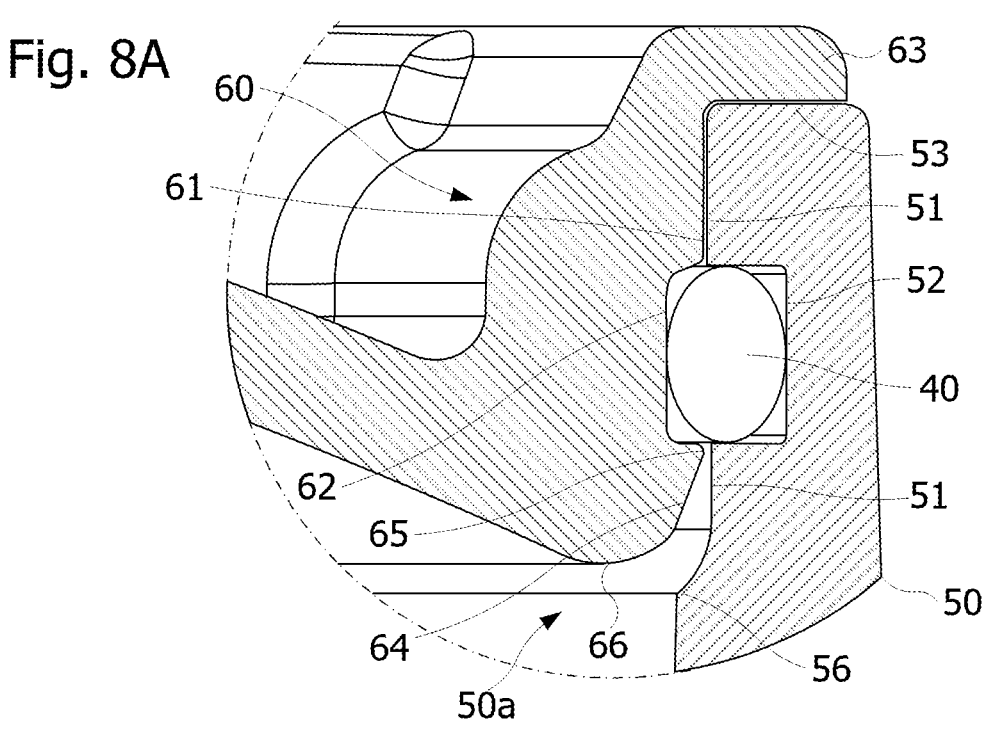
FIGS. 8A, 8B are more detailed sectional views of an edge of the lid, respectively in a closed position on the case opening and in a position preceding the closed position, according to another embodiment.
Figure 8B:
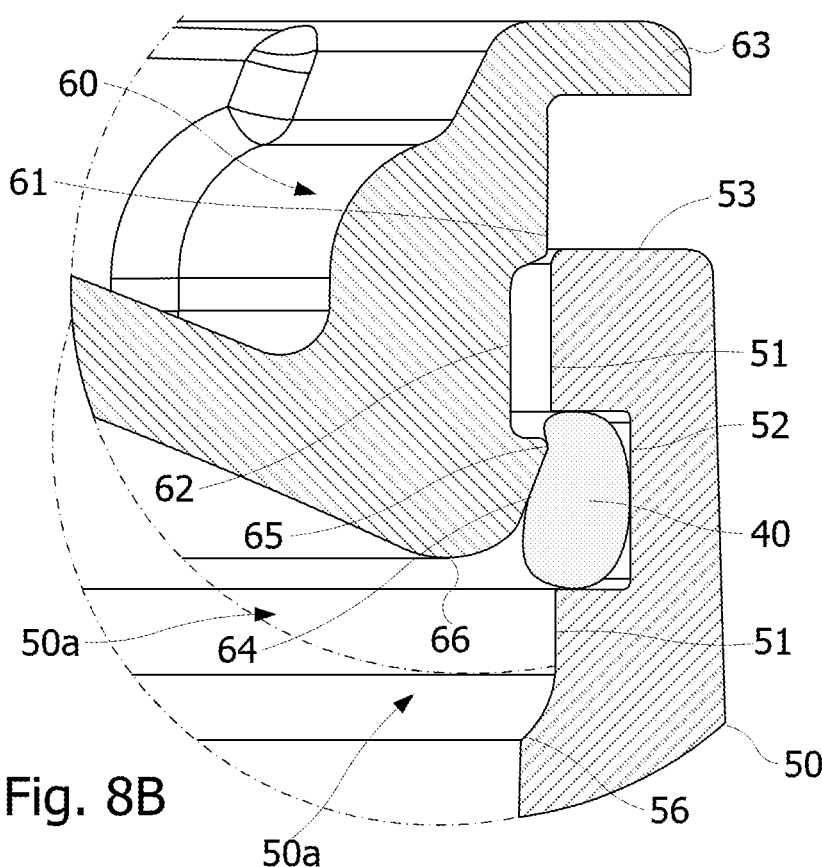

FIGS. 8A, 8B represent the edge of a lid 60 and a portion of a case 50, in a closed position on the opening 50*a* of the case 50 and respectively in a position preceding the closed position, according to one embodiment. In this embodiment, the lid 60 and the case differ from those represented in particular in FIGS. 7A, 7B in that the frustoconical portion 64 is not formed by the inner wall of the case, but by an inner wall 61 of the lid 60, between the groove 62 formed in this inner wall and a lower edge 66 of the inner wall of the lid 61. Thus, the opening 50*a* in the case 50 has a substantially cylindrical shape with an annular groove 52 in which the O-ring seal 40 is inserted. The frustoconical-shaped portion 64 is shaped so that the lid 60 can be introduced into the case 50 without effort until the frustoconical-shaped portion 64 abuts on the seal 40. In this embodiment, the lid 60 may also comprise a rim 63 forming with the edge 53 of the case a closing abutment for the lid 60. This closing abutment can be reached as mentioned above by exerting a pressure on the lid to force the seal 40 to cross a greater-diameter end 65 of the frustoconical portion 64, by elastically deforming (FIG. 8B), until the seal 40 reaches the groove 62 of the lid 60 where it tends to have its initial undeformed shape (FIG. 8A). Thus, just before the lid 60 reaches its closed position, the seal 40 reaches maximum deformation, to return to a less deformed configuration in the grooves 52, 62. In this way, the lid 60 is also clipped onto the case 50, in the closed position. In order to ensure that the seal is maintained in the groove 52 in particular during the insertion of the lid 60, the groove 52 can be deeper than the groove 62. In addition, the groove 52 can have a section with a narrower portion, for example a dovetail-shaped portion to retain the seal.

Figure 9:
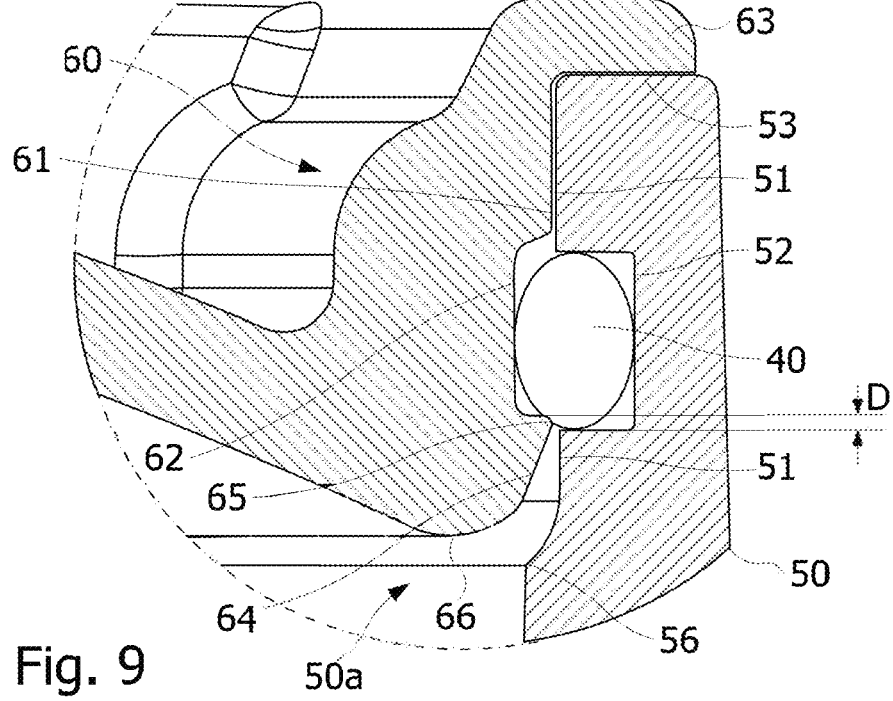
FIG. 9 is a more detailed sectional view of an edge of the lid, in a closed position on the case opening, according to another embodiment.

According to one embodiment shown in FIG. 9, the groove 52 is also offset slightly towards the inside of the case, relative to the groove 62, for example by a distance D comprised between 0.3 and 0.8 mm, to absorb the gaps and ensure that the lid is plated against the case opening 50*a*, the rim 63 of the lid then being in abutment against the edge 53 of the opening. Thus, in the closed position, the smaller-diameter end 65 of the frustoconical portion 64 slightly compresses the seal 40.

To ensure tightness of the closure performed by the lid, the seal 40 remains compressed in the grooves 52, 62.

According to one embodiment, 70 to 75% of the seal is accommodated in the groove 52 of the case and respectively 30 to 25% is accommodated in the groove 62 of the lid. Thus, the seal 40 can be maintained in the groove 52, so that the smaller-diameter end 65 of the frustoconical portion 64 can cross the seal 40 without tearing the latter from the groove 52 or damaging it. Furthermore, the section of the seal 40 can be dimensioned so that the lid can remain in the closed position despite a pressure differential of 35 kPa between the inside and the exterior outside the case 50, the internal pressure being greater than the external pressure. The resistance of the lid 60 to an expulsion pressure from the case 50 can also be increased by increasing the proportion of the seal 40 accommodated in the groove 62.

According to an exemplary embodiment, the flaring angle (relative to the direction of insertion of the lid into the case) of the frustoconical portion 64 of the lid 60 is comprised between 15 and 30°. Thus, the seal 40 can be compressed progressively enough to avoid being torn from groove 52 or damaged.

It will clearly appear to those skilled in the art that the present invention is subject to various embodiments and various applications. In particular, the invention is not limited to the case accommodating a speed reducer of a power steering system for motor vehicles, but can apply more generally to a power steering case having an opening to be closed off in a sealed manner by a lid.

The opening in the case and the lid 30, 60 do not necessarily have a circular or elliptical shape, but may have any other rounded shape likely to make it possible to ensure tightness using a seal. The seal can be molded to match the contour of the opening in the case.

The abutment formed by the rim 33, 63 of the lid 30, 60 can be omitted. Indeed, the inner wall 31 of the lid 30 can be shaped to match the shape of the frustoconical portion 24 of the case and come into abutment against the latter when the lid is in the closed position. An abutment can also be performed by an annular shoulder 26, 56 formed in the inner wall 21, 51 of the case 20, 50, this abutment being disposed so as to cooperate with one end 36, 66 of the inner wall 31, 61 of the lid 30, 60 when the latter is in the closed position on the opening of the case.

The invention claimed is:

1. A power steering case comprising an opening, a lid configured to close the opening of the case, and an O-ring seal in a first annular groove, formed in a first inner wall of one of the lid or of the case, a second inner wall of another of the case or of the lid having a frustoconical shaped portion configured to progressively compress the seal before reaching the closed position of the lid where the seal regains a less deformed initial shape in a second annular groove facing the first annular groove and formed in the second inner wall, wherein the first annular groove and the second annular groove are shaped to accommodate 70 to 75% of the seal in the first annular groove and 30 to 25% in the second annular groove.

2. The case according to claim 1, wherein:

the first inner wall is on the lid, and the second inner wall is in the case, or the first inner wall is in the case, and the second inner wall is on the lid.

3. The case according to claim 1, wherein the lid comprises a peripheral rim configured to abut against an edge of the opening of the case when the lid is in the closed position.

4. The case according to claim 1, wherein the first annular groove is deeper than the second annular groove.

5. The case according to claim 1, wherein the seal has a section dimensioned to maintain the lid in the closed position with a pressure differential of 35 kPa between inside and outside of the case.

6. The case according to claim 1, wherein the frustoconical shaped portion has a flare angle between 15 and 30° relative to a direction of insertion of the lid in the opening of the case.

7. The case according to claim 1, wherein the groove in the case is offset towards the inside of the case relative to the groove in the lid by a distance between 0.3 and 0.8 mm.

8. A method for attaching a lid to an opening in a power steering case, the method comprising:

inserting the lid into the opening of the case until an O-ring seal in a first annular groove, formed in a first inner wall of one of the lid or of the case, comes into contact with a frustoconical shaped portion of a second inner wall of another of the case or of the lid, and exerting a pressure on the lid to pass the O-ring seal over the frustoconical shaped portion where the O-ring is compressed progressively, until reaching a closed position of the lid on the opening of the case, where the seal regains a less deformed shape in a second annular groove facing the first annular groove and formed in the second inner wall, wherein the first annular groove and the second annular groove are shaped to accommodate 70 to 75% of the seal in the first annular groove and 30 to 25% in the second annular groove.

9. The method according to claim 8, wherein:

the first inner wall is on the lid, and the second inner wall is in the case, or the first inner wall is in the case, and the second inner wall is on the lid.

10. The method according to claim 8, wherein, when the lid is in the closed position:

a peripheral rim of the lid is in abutment against an annular edge of the opening of the case, and/or the inner wall of the lid is in abutment against the frustoconical shaped portion of the case, and/or one end of the inner wall of the lid is in abutment against an annular shoulder formed by the inner wall of the case.

11. The method according to claim 8, wherein, in the closed position of the lid, the seal in the first and second annular grooves is maintained elastically deformed.

12. The method according to claim 8, wherein the seal has a section dimensioned to maintain the lid in the closed position against a pressure differential of 35 kPa between inside and outside of the case.

* * * * *